(12) United States Patent
Liu et al.

(10) Patent No.: US 11,196,143 B2
(45) Date of Patent: Dec. 7, 2021

(54) ANTENNA ELEMENT, ANTENNA ARRAY AND BASE STATION

(71) Applicant: AAC Technologies Pte. Ltd., Singapore (SG)

(72) Inventors: Jianchuan Liu, Shenzhen (CN); Yuehua Yue, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 125 days.

(21) Appl. No.: 16/703,893

(22) Filed: Dec. 5, 2019

(65) Prior Publication Data
US 2020/0203803 A1 Jun. 25, 2020

(30) Foreign Application Priority Data
Dec. 25, 2018 (CN) .......................... 201811587798.9

(51) Int. Cl.
*H01Q 1/24* (2006.01)
*H01Q 21/29* (2006.01)
(Continued)

(52) U.S. Cl.
CPC ............ *H01Q 1/241* (2013.01); *H01Q 21/29* (2013.01); *H04B 7/0413* (2013.01); *H04B 7/0691* (2013.01)

(58) Field of Classification Search
CPC combination set(s) only.
See application file for complete search history.

(56) References Cited

U.S. PATENT DOCUMENTS 6,356,242 B1 * 3/2002 Ploussios ................ H01Q 9/42
343/795
9,490,542 B1 * 11/2016 Prinsloo ................ H01Q 21/29
(Continued)

FOREIGN PATENT DOCUMENTS

| CN | 2619374 B1 | 6/2004 |
| CN | 107069197 A1 | 8/2017 |

(Continued)

OTHER PUBLICATIONS

1st Office Action dated Jan. 3, 2020 by SIPO in related Chinese Patent Application No. 201811587798.9 (11 Pages).
(Continued)

*Primary Examiner* — Junpeng Chen
(74) *Attorney, Agent, or Firm* — W&G Law Group

(57) ABSTRACT

Embodiments of the present application disclose an antenna element, an antenna array, and a base station. The antenna element comprises: a metal floor; and a first polarized antenna and a second polarized antenna disposed on an insulating bracket, wherein the insulating bracket is disposed on the metal floor; the first polarized antenna is orthogonal in polarization to the second polarized antenna; the shape of a radiating surface is a graph surrounded by an asteroid, a first oscillating arm and a second oscillating arm are symmetrically disposed; a first feeding end and a second feeding end are differentially fed; the second polarized antenna is composed of a third feeding end, a fourth feeding end, and a second symmetrical oscillator located on the radiating surface; a third oscillating arm and a fourth oscillating arm are symmetrically disposed; the third feeding end and the fourth feeding end are differentially fed.

15 Claims, 15 Drawing Sheets

(51) Int. Cl.
*H04B 7/0413* (2017.01)
*H04B 7/06* (2006.01)

(56) References Cited

U.S. PATENT DOCUMENTS

| | | | |
|---|---|---|---|
| 10,797,408 B1* | 10/2020 | Boutayeb | H01Q 21/24 |
| 2016/0372839 A1* | 12/2016 | Watson | H01Q 21/24 |
| 2017/0085009 A1* | 3/2017 | Watson | H01Q 1/50 |
| 2018/0175515 A1* | 6/2018 | Boutayeb | H01Q 3/24 |
| 2019/0140364 A1* | 5/2019 | Mirmozafari | H01Q 21/24 |
| 2019/0190562 A1* | 6/2019 | Chen | H04B 1/48 |

FOREIGN PATENT DOCUMENTS

| | | |
|---|---|---|
| CN | 107528115 B2 | 12/2017 |
| CN | 110011026 A1 | 7/2019 |

OTHER PUBLICATIONS

PCT search report dated Feb. 1, 2020 by SIPO in related PCT Patent Application No. PCT/CN2019/113279 (4 Pages).

\* cited by examiner

ANTENNA ELEMENT, ANTENNA ARRAY AND BASE STATION

TECHNICAL FIELD

The embodiments of the present application relate to the field of communication, and in particular, to an antenna element, an antenna array, and a base station.

BACKGROUND

The Ministry of Industry and Information Technology has planned the following four frequency bands for China's 5G technology R&D trials: 3.3-3.6 GHz band, 4.8-5.0 GHz band, 24.75-27.5 GHz band, 37-42.5 GHz band, which fully reflects China's determination on supporting 5G international standards and technology verification and accelerating the development of 5G industry. Massive multi-input multi-output antenna technology (Massive MIMO) is undoubtedly one of the most critical technologies in 5G systems.

Adopting large-scale antennas can significantly increase spectrum efficiency, especially when capacity requirements are large or coverage is wide, which enables 4G networks to meet network growth requirements. From the operator's point of view, this technology has a good prospect, and it should be implemented in 5G hardware in advance, and 5G air interface function should be provided through software upgrade to facilitate 5G deployment.

Massive Multiple Input Multiple Output (Massive MIMO) technology has the following advantages:

With Massive MIMO antenna arrays, the spectral efficiency is 3 to 5 times greater than that of ordinary macro base stations.

Massive MIMO increases the flexibility of network coverage, and the operators may utilize horizontal and vertical coverage features of Massive MIMO to provide coverage in different scenarios.

With amazing high-capacity gains, Massive MIMO is expected to help the operators to draw users by machine-flexible billing policies, which provides an incomparable user experience, stimulates the user's data consumption, gains traffic revenue, and increases the operator's income.

Massive MIMO is compatible with 4G terminals, and the operators can now benefit from 4G network deployments. At the same time, it also supports 5G-oriented network evolution to maintain and enhance the return of existing investments.

It can be seen that in order to realize the technical advantages of Massive MIMO, how to design a Massive MIMO antenna is an urgent problem to be solved.

BRIEF DESCRIPTION OF THE DRAWINGS

One or more embodiments are exemplified by corresponding pictures in the accompanying drawings, and these exemplary descriptions do not constitute a limitation on the embodiments. Elements in the drawings having the same reference numerals represent like elements, and unless otherwise stated, the figures in the drawings do not constitute a scale limitation.

DETAILED DESCRIPTION

To make the objects, technical solutions and advantages of the embodiments of the present application more clear, the embodiments of the present application will be described in detail below with reference to the accompanying drawings. However, those skilled in the art will appreciate that in the various embodiments of the present application, numerous technical details are set forth in order to provide the reader with a better understanding of the application. However, the technical solutions claimed in the present application can be implemented without these technical details and various changes and modifications based on the following embodiments.

Figure 1:
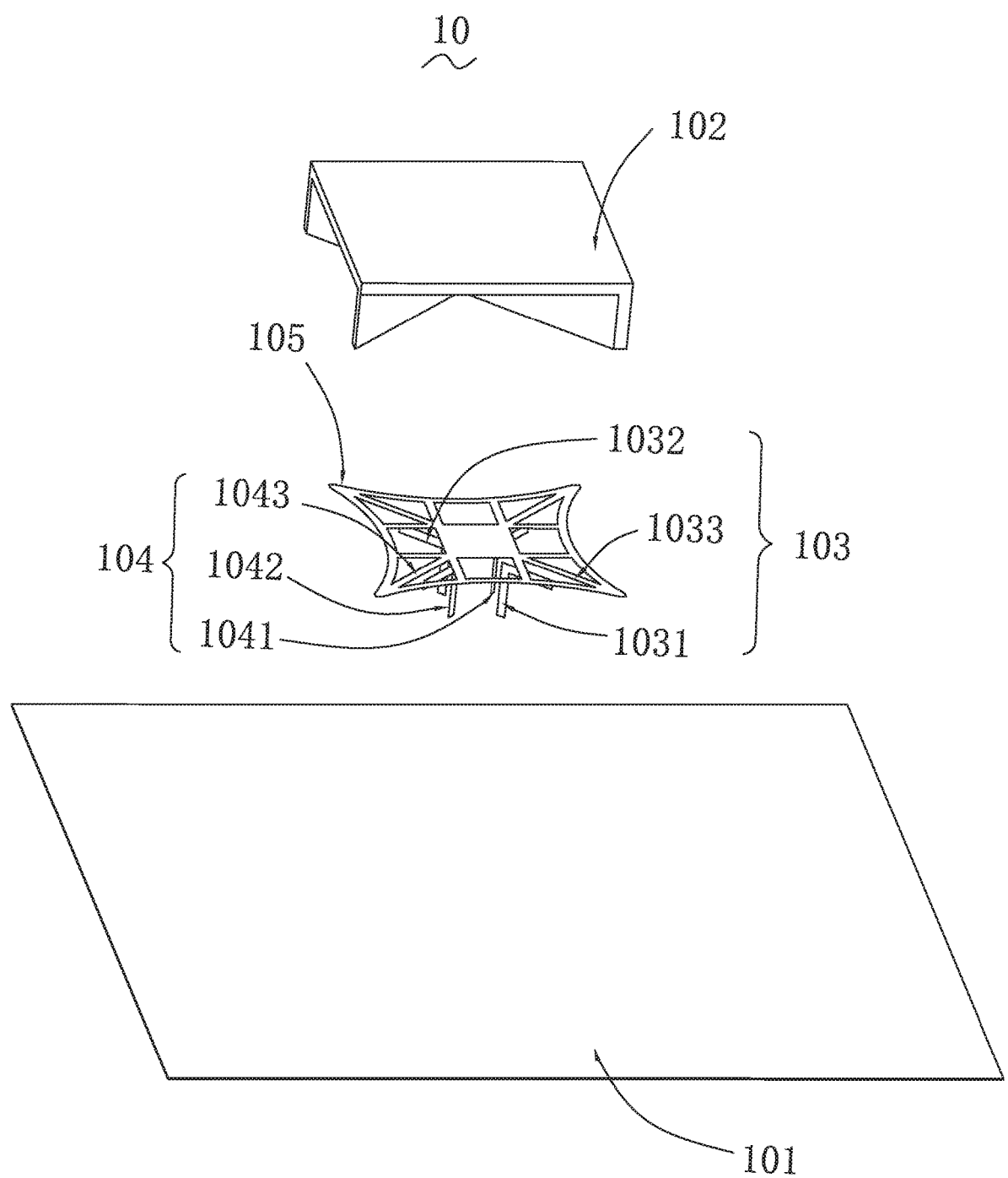
FIG. 1 is a schematic exploded view illustrating an antenna element provided according to a first embodiment of the present application.
Figure 2:
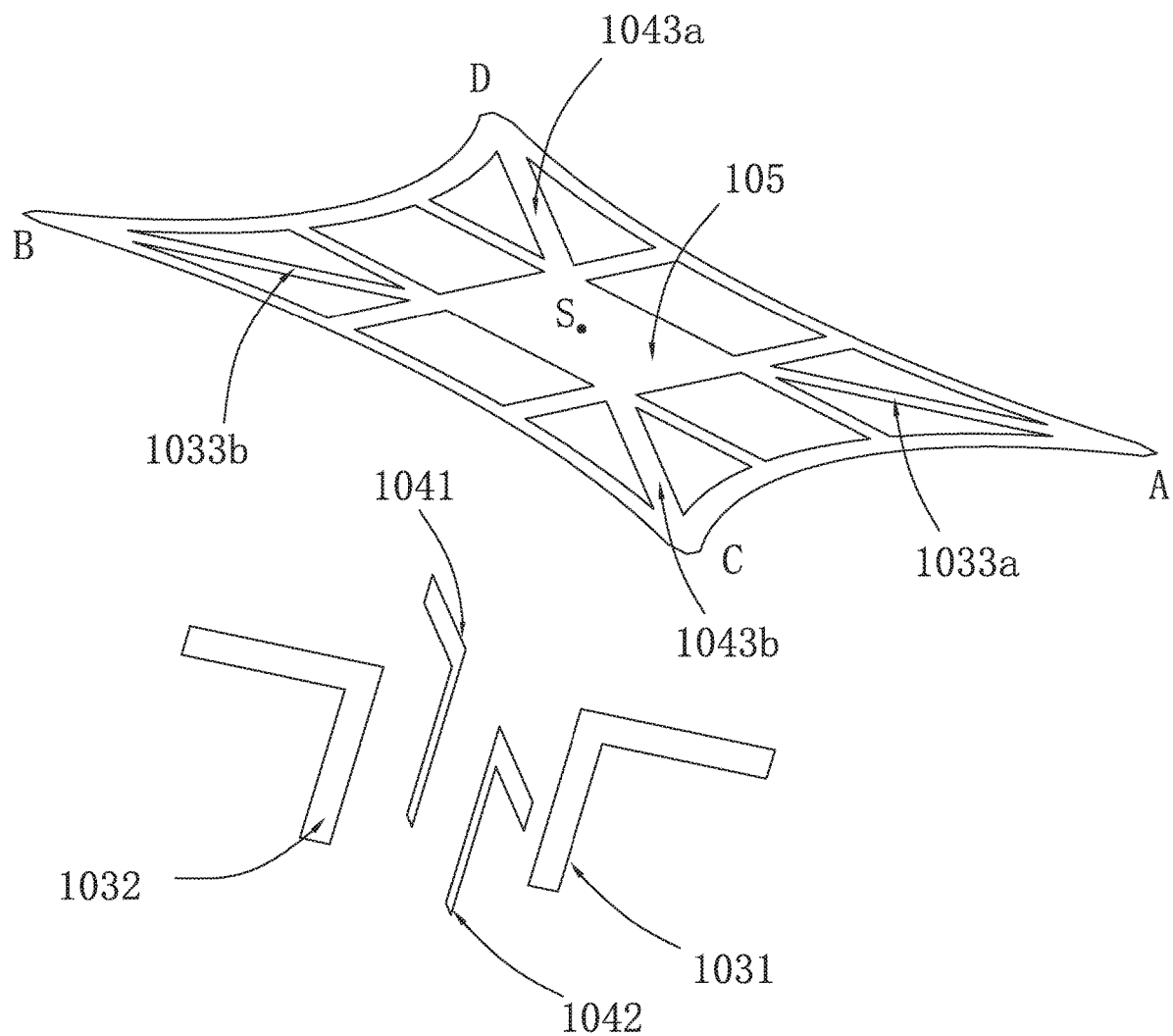
FIG. 2 is a schematic exploded view illustrating a first polarized antenna and a second polarized antenna provided according to the first embodiment of the present application.

The first embodiment of the present application relates to an antenna element. The antenna element is applied to a base station carrying a radio frequency unit, such as a macro base station, a distributed base station, or the like. The antenna element 10 comprises a metal floor 101; and a first polarized antenna 103 and a second polarized antenna 104 disposed on the insulating bracket 102, where the insulating bracket 102 is disposed on the metal floor 101. The structure of the antenna element 10 is as shown in FIGS. 1 and 2. Wherein, FIG. 1 is an exploded structural view illustrating the antenna element 10.

In order to increase the signal gain of the antenna element 10, the first polarized antenna 103 is orthogonal in polarization to the second polarized antenna 104. In the present embodiment, the first polarized antenna 103 and the second polarized antenna 104 are orthogonal polarized in ±45°.

The first polarized antenna 103 is composed of a first feeding end 1031, a second feeding end 1032 and a first symmetrical oscillator 1033 located on a radiating surface 105, the shape of the which is a graph surrounded by an asteroid, the first symmetrical oscillator 1033 comprises a first oscillating arm 1033a and a second oscillating arm 1033b. The first oscillating arm 1033a and the second oscillating arm 1033b are symmetrically disposed by taking the center point of the radiating surface 105 as a first symmetric center; the first oscillating arm 1033a is coupled to the first feeding end 1031, and the second oscillating arm 1033b is coupled to the second feeding end 1032; wherein, the first feeding end 1031 and the second feeding end 1032 are differentially fed. The specific structure can be seen in FIGS. 2 and 3.

Figure 3:
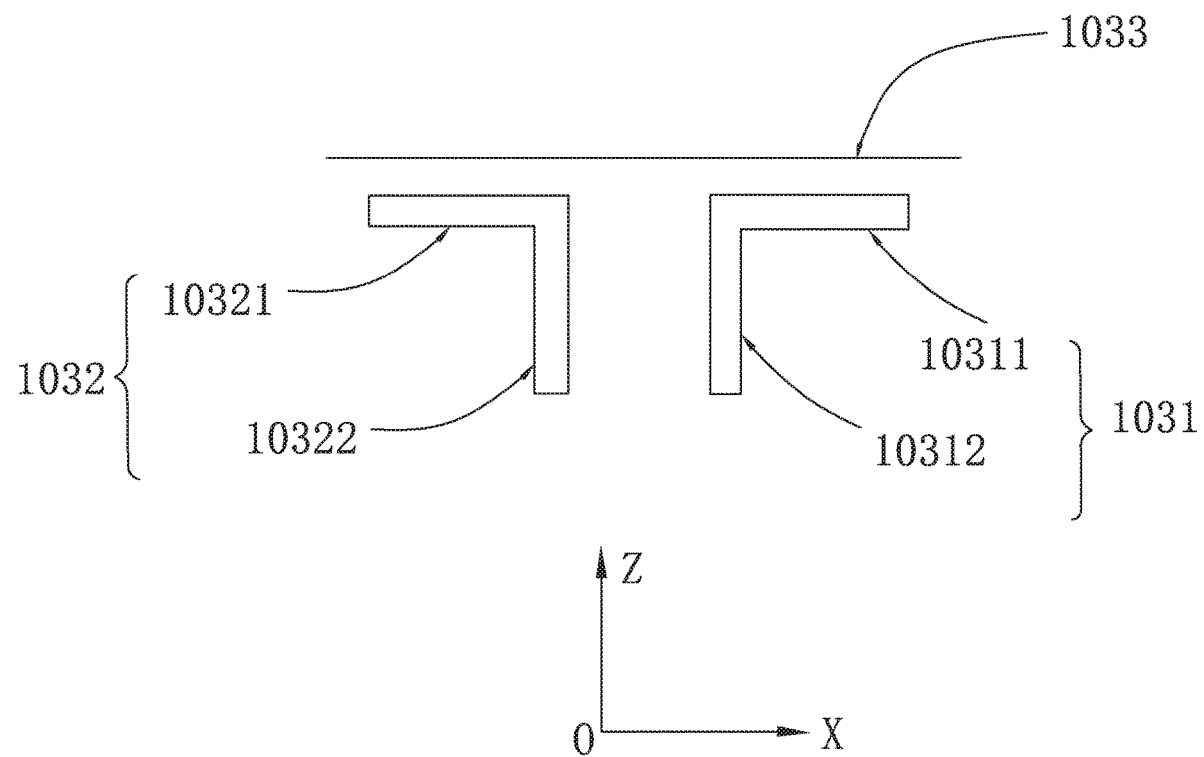
FIG. 3 is a side view illustrating the first polarized antenna provided according to the first embodiment of the present application.

FIG. 2 is a schematic exploded view of a first polarized antenna 103 and a second polarized antenna 104. FIG. 3 is a side cross section view of the first polarized antenna. The specific structure of the first polarized antenna will be described in detail below with reference to FIGS. 2 and 3.

Specifically, as shown in FIG. 2, the shape of the radiating surface 105 is a graph surrounded by an asteroid (ie, a graph including a sharp corner A, a sharp corner B, a sharp corner C, and a sharp corner D in FIG. 2). The radiating surface 105 may be made of a conductive material, such as a metal, or the radiating surface is completely covered by a conductive layer. The first symmetrical oscillator 1033 of the first polarized antenna 103 may be disposed in a diagonal direction of the radiating surface 105, wherein, the first oscillating arm 1033a and the second oscillating arm 1033b are symmetrically disposed by taking a center point S of the radiating surface 105 as a center of symmetry.

It will be understood that the radiating surface 105 may also be set to be hollowed out, as the hollowed out radiating surface 105 shown in FIG. 2. The radiating surface 105 may be hollowed out by means of exposing the respective oscillating arms, and the preset region of the radiating surface 105 (The preset region is the intermediate parallelogram in FIG. 2) is completely covered by a conductive layer.

For convenience of description, a Cartesian coordinate system is introduced in FIG. 2, the center point of the radiating surface 105 is denoted as S, the first oscillating arm 1033a starts from the point S and extends in a positive direction of the X-axis to the sharp corner A of the radiating surface 105, and the second oscillating arm 1033b starts from the point S and extends in a negative direction of the X-axis to the sharp corner B of the radiating surface 105, wherein the sharp corner A and the sharp corner B are symmetrical.

The structure of the first feeding end 1031 and the second feeding end 1032 is shown in FIG. 3.

In one embodiment, the first feeding end 1031 comprises a first horizontal feeding piece 10311 and a first vertical feeding piece 10312, a first end of the first horizontal feeding piece 10311 extends in a direction of the first oscillating arm 1033a, a second end of the first horizontal feeding piece 10311 is connected to a first end of the first vertical feeding piece 10312, and a second end of the first vertical feeding piece 10312 extends in a direction perpendicular to the first horizontal feeding piece 10311. The second feeding end 1032 comprises a second horizontal feeding piece 10321 and a second vertical feeding piece 10322, a first end of the second horizontal feeding piece 10321 extends in a direction of the second oscillating arm 1033b, a second end of the second horizontal feeding piece 10321 is connected to a first end of the second vertical feeding piece 10322, and a second end of the second vertical feeding piece 10322 extends in a direction perpendicular to the second horizontal feeding piece 10321.

Specifically, the second end of the first vertical feeding piece 10312 is connected to a radio frequency unit of the base station, and the radio frequency signal is transmitted to the first horizontal feeding piece 10311 through the first vertical feeding piece 10312. Since the first horizontal feeding piece 10311 extends in the direction of the first oscillating arm 1033a (i.e. the positive direction of the X-axis as shown in FIG. 3) and is parallel to the first oscillating arm 1033a, in the process of the radio frequency signal flowing through the first horizontal feeding piece 10311, the first feeding end 1031 is coupled to the first oscillating arm 1033a. The second feeding end 1032 is similarly coupled to the second oscillating arm 1033b and thus will not be described again here.

The second polarized antenna 104 is composed of a third feeding end 1041, a fourth feeding end 1042 and a second symmetrical oscillator 1043 located on the radiating surface 105. The second symmetrical oscillator 1043 comprises a third oscillating arm 1043a and a fourth oscillating arm 1043b; the third oscillating arm 1043a and the fourth oscillating arm 1043b are symmetrically disposed by taking the center point of the radiating surface 105 as a second center of symmetry; the third oscillating arm 1043a is coupled to the third feeding end 1041, and the fourth oscillating arm 1043b is coupled to the fourth feeding end 1042, wherein the third feeding end 1041 and the fourth feeding end 1042 are differentially fed. The specific structure is shown in FIGS. 2 and 4.

Specifically, the second symmetrical oscillator 1043 is located on the radiating surface 105, that is, the first symmetrical oscillator 1033 is coplanar with the second symmetrical oscillator 1043. Similar to the structure of the first symmetrical oscillator 1033, the second symmetrical oscillator 1043 is disposed in a direction of the other diagonal line of the radiating surface 105, wherein the second oscillating arm 1043a and the fourth oscillating arm 1043b are symmetrically disposed by taking the center point S of the radiating surface 105 as a center of symmetry. As shown in FIG. 2, the center point of the radiating surface 105 is denoted as S, the second oscillating arm 1043a starts from the point S and extends in a positive direction of the Y-axis to the sharp corner C of the radiating surface, and the fourth oscillating arm 1043b starts from the point S and extends in a negative direction of the Y-axis to the sharp corner D of the radiating surface 105, where the sharp corner C and the sharp corner D are symmetrical.

Figure 4:
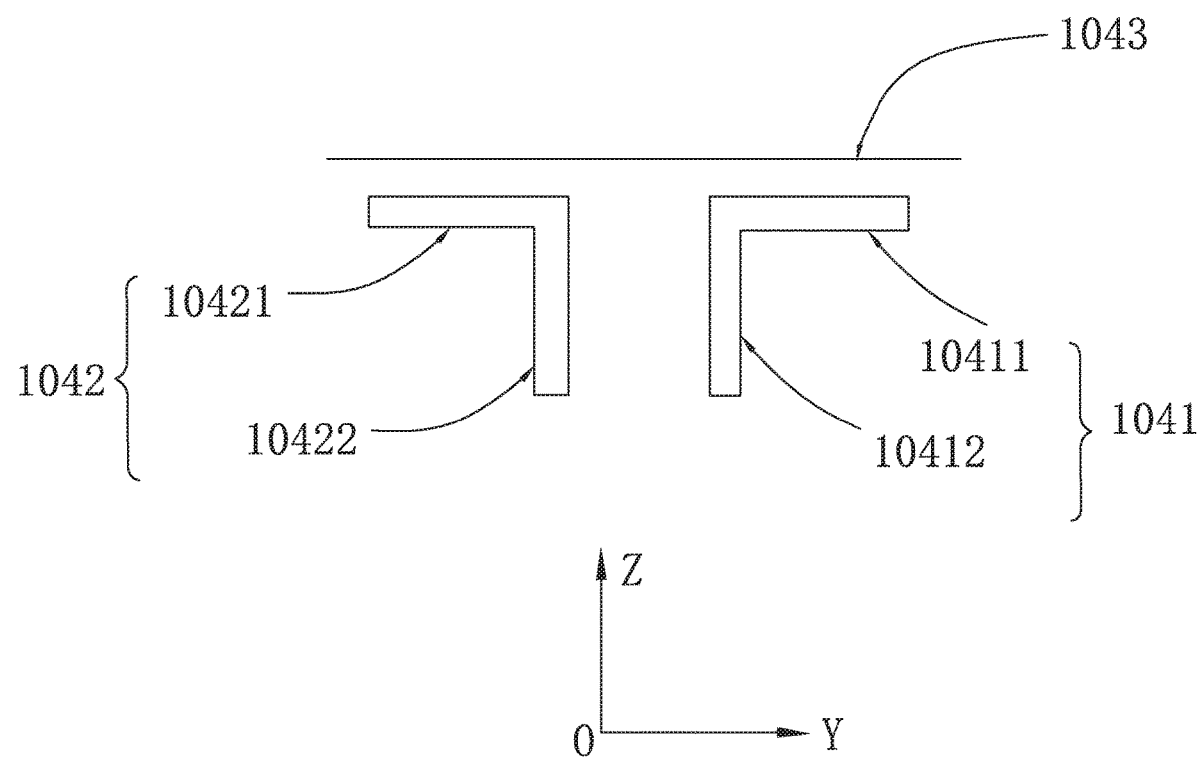
FIG. 4 is a side view illustrating a second polarized antenna provided according to the first embodiment of the present application.

Referring to FIGS. 2 and 4, the third oscillating arm 1043a is coupled to the third feeding end 1041, and the fourth oscillating arm 1043b is coupled to the fourth feeding end 1042.

In one embodiment, the third feeding end 1041 comprises a third horizontal feeding piece 10411 and a third vertical feeding piece 10412, a first end of the third horizontal feeding piece 10411 extends in a direction of the third oscillating arm 1043a, a second end of the third horizontal feeding piece 10411 is connected to a first end of the third vertical feeding piece 10412, and a second end of the third vertical feeding piece 10412 extends in a direction perpendicular to the third horizontal feeding piece 10411; the fourth feeding end 1042 comprises a fourth horizontal feeding piece 10421 and a fourth vertical feeding piece 10422, a first end of the fourth horizontal feeding piece 10421 extends in a direction of the fourth oscillating arm 1043b, a second end of the fourth horizontal feeding piece 10421 is connected to a first end of the fourth vertical feeding piece 10422, and a second end of the fourth vertical feeding piece 10422 extends in a direction perpendicular to the fourth horizontal feeding piece 10421.

Specifically, the second end of the third vertical feeding piece 10412 is connected to a radio frequency unit of the base station, and the radio frequency signal is transmitted to the third horizontal feeding piece 10411 through the third vertical feeding piece 10412. Since the third horizontal feeding piece 10411 extends in the direction of the third oscillating arm 1043a and is parallel to the third oscillating arm 1043a, in the process of the radio frequency signal flowing through the third horizontal feeding piece 10411, the third feeding end 1041 is coupled to the third oscillating arm 1043a. The fourth feeding end 1042 is similarly coupled to the fourth oscillating arm 1043b and thus will not be described again here.

It should be noted that the first feeding end 1031 and the second feeding end 1032 share a first feeding point (not shown), and the phase difference between the first feeding end 1031 and the second feeding end 1032 is 180°, such that the first feeding end 1031 and the second feeding end 1032 form a differential feeding. Similarly, the third feeding end 1041 and the fourth feeding end 1042 of the second polarized antenna share a second feeding point (not shown), and the phase difference between the third feeding end 1041 and the fourth feeding end 1042 is 180°, such that the third feeding end 1041 and the fourth feeding end 1042 form a differential feeding.

It will be understood that the shapes of the first feeding end 1031, the second feeding end 1032, the third feeding end 1041 and the fourth feeding end 1042 are the same and the areas of the respective feeding ends should be the same, such that the first oscillating arm 1033a, the second oscillating arm 1033b, the third oscillating arm 1043a, and the fourth oscillating arm 1043b generate stable signals.

Figure 5:
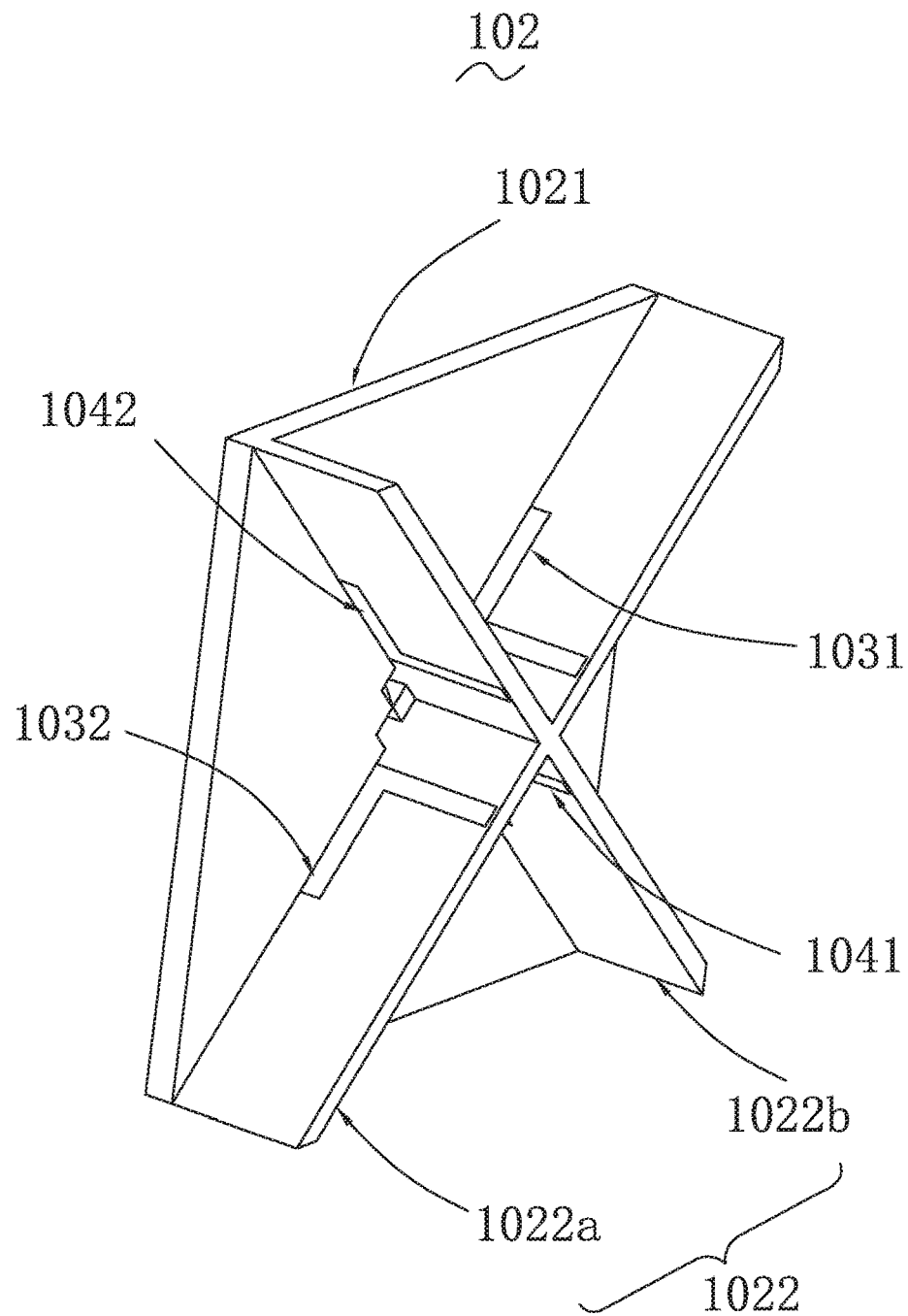
FIG. 5 is a schematic structural view illustrating an insulating bracket provided according to the first embodiment of the present application.
Figure 6:
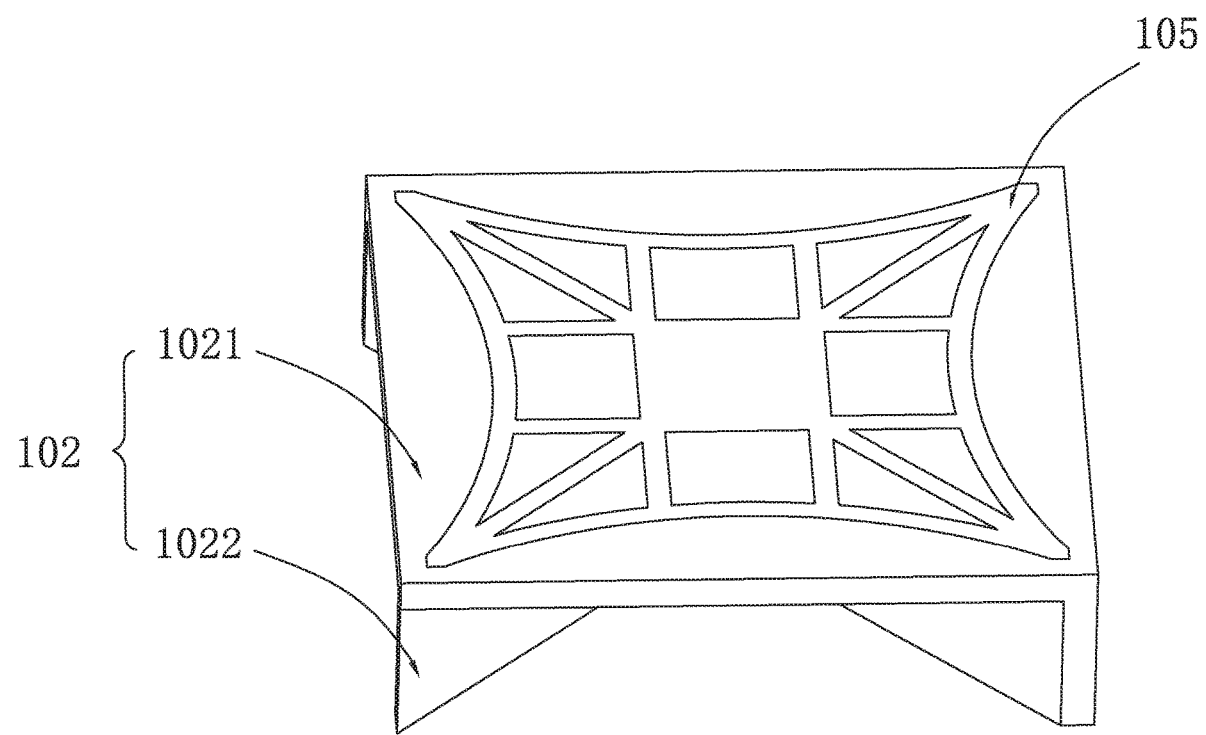
FIG. 6 is a schematic structural view illustrating the insulating bracket and a radiating surface provided according to the first embodiment of the present application.

In one embodiment, the insulating bracket 102 comprises a supporting surface 1021 and a supporting frame 1022; a first surface of the supporting surface 1021 is provided with the radiating surface 105, and the second surface of the supporting surface 1021 is connected to the supporting frame 1022, wherein an area of the supporting surface 1021 is larger than that of the radiating surface 105; the supporting frame 1022 comprises a first bracket 1022a and a second bracket 1022b, the first bracket 1022a and the second bracket 1022b are disposed cross each other; the first feeding end 1031 and the second feeding end 1032 are symmetrically disposed on a sidewall of the first bracket 1022a by taking a center point of the supporting surface 1021 as a center of symmetry; and the third feeding end 1041 and the fourth feeding end 1042 are symmetrically disposed on a sidewall of the second bracket 1022b by taking the center point of the supporting surface 1021 as a center of symmetry. The specific structure is shown in FIGS. 1, 5 and 6.

Figure 7:
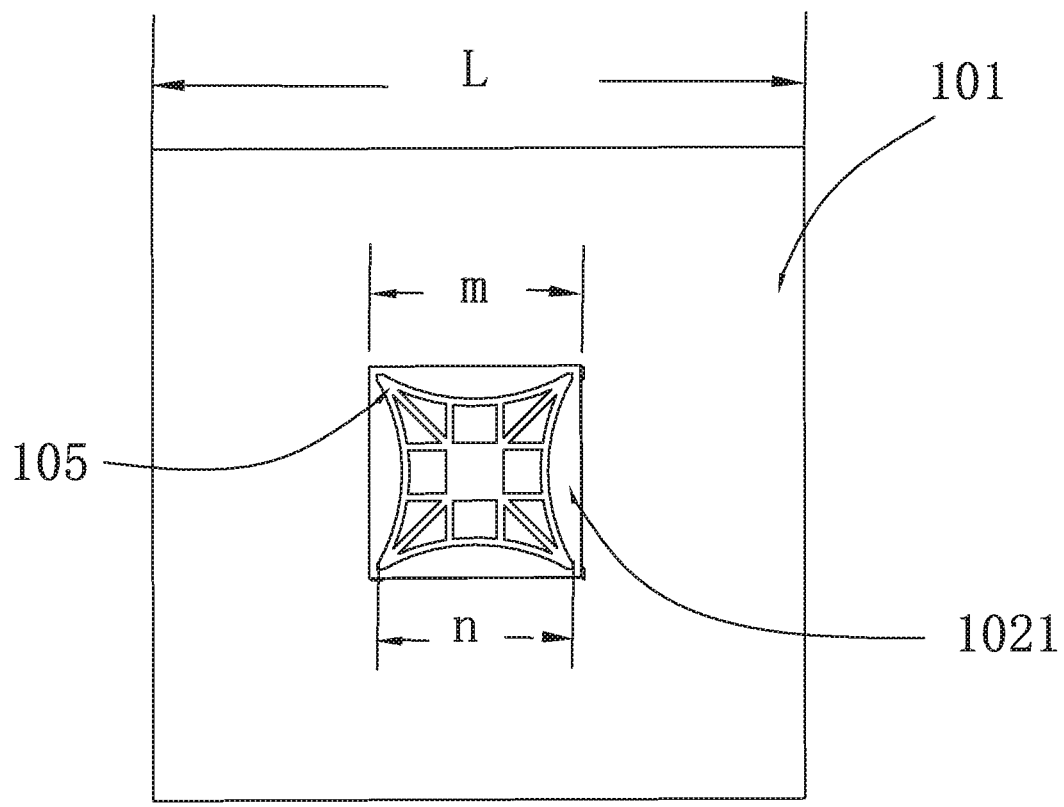
FIG. 7 is a top view of an antenna element provided according to the first embodiment of the present application.
Figure 7:
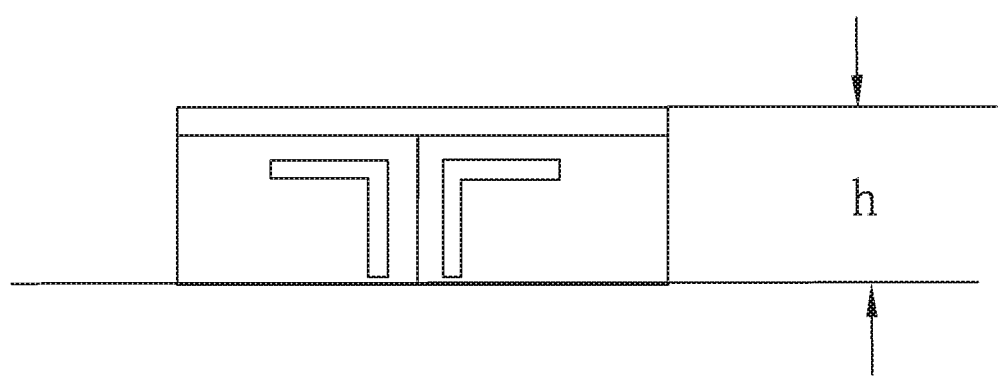

Specifically, FIG. 7 is a top view of the antenna element. As shown in FIG. 7, the area of the supporting surface 1021 is larger than that of the radiating surface 105, and the specific size can be selected according to an operating frequency band. For example, when operating at 3400~3600 MHz, if the distance n between adjacent sharp corners of the radiating surface is 25.5 mm, the supporting surface may be set to be a square with a width m of 27 mm, and the height h of the entire insulating bracket 102 is 7.4 mm, the metal floor 101 on which the insulating bracket 102 is placed may be set as a square with a length L of 100 mm. Of course, it will be understood that the dimensions of the metal floor 101, the radiating surface 105, and the supporting surface 1021 described above are merely illustrative.

Specifically, in the specific structure of the insulating bracket 102, the insulating bracket 102 may be a plastic bracket. If a surface of the radiating surface 105 is completely covered by a conductive layer, the radiating surface 105 may be disposed on the first surface of the supporting surface 1021 by a stamping process or a PCB process. If the four corners of the radiating surface 105 are hollowed out, the radiating surface 105 may be disposed on the first surface of the supporting surface 1021 by the LDS process.

Figure 8:
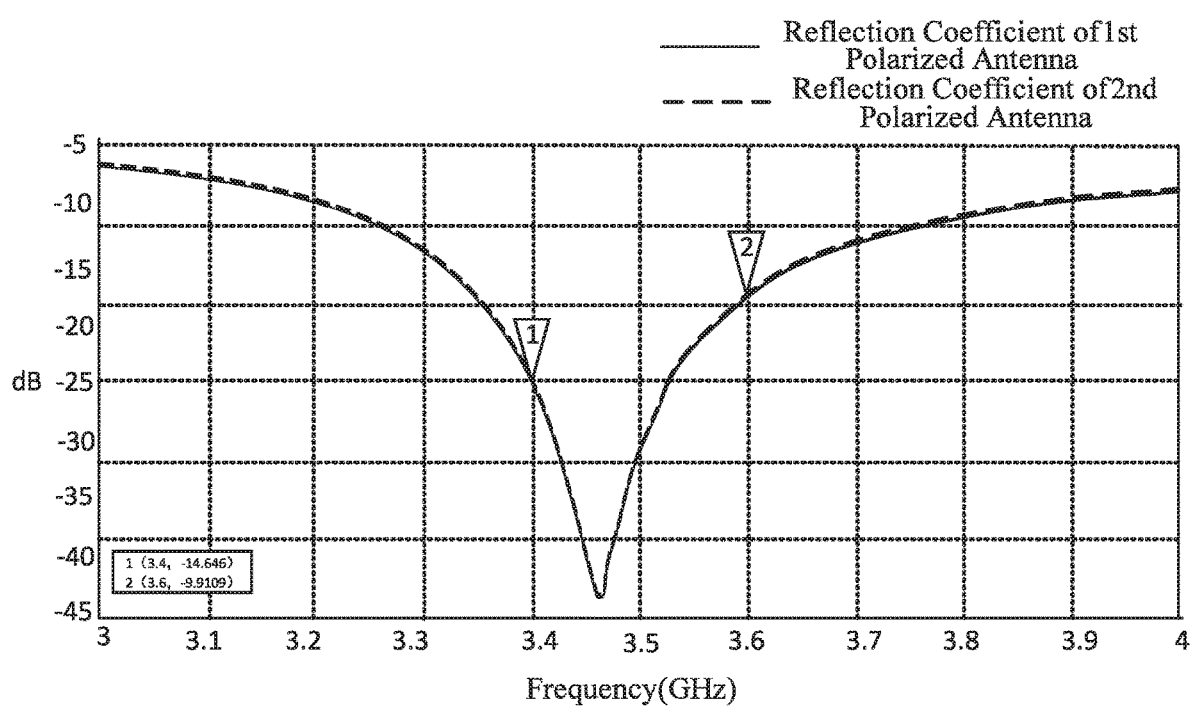
FIG. 8 is a schematic diagram illustrating a reflection coefficient of the antenna element provided according to the first embodiment of the present application.
Figure 9:
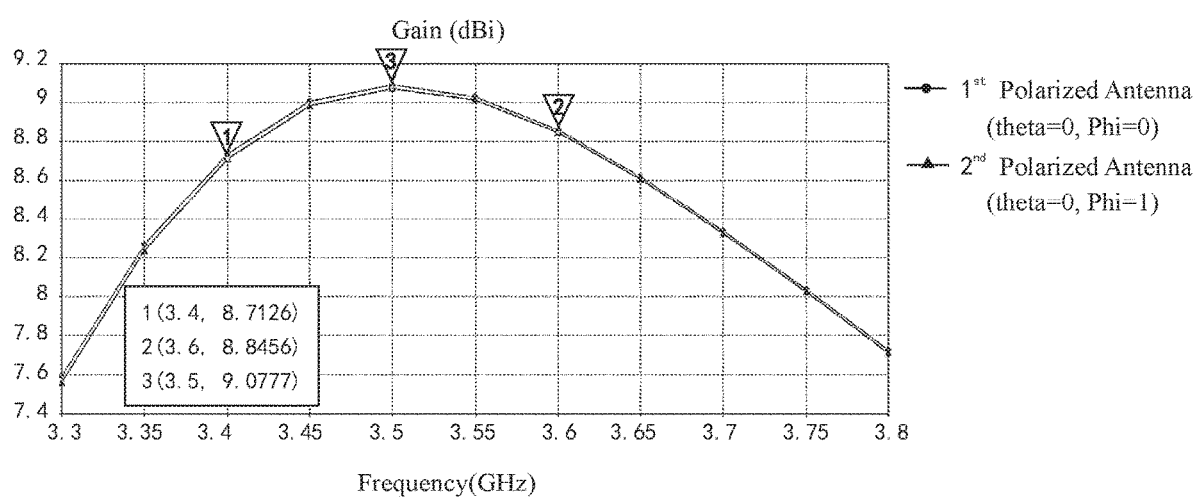
FIG. 9 is a schematic diagram illustrating a gain of the antenna element provided according to the first embodiment of the present application.

The operating effect of the antenna element 10 will be described below in conjunction with the performance diagram of the antenna element:

The performance simulation of the reflection coefficient of the antenna element is shown in FIG. 8, and the gain of the antenna element is shown in FIG. 9. In the present embodiment, it can be seen that the performance is good in the operating frequency range of 3.4 GHz to 3.6 GHz.

Figure 10A:
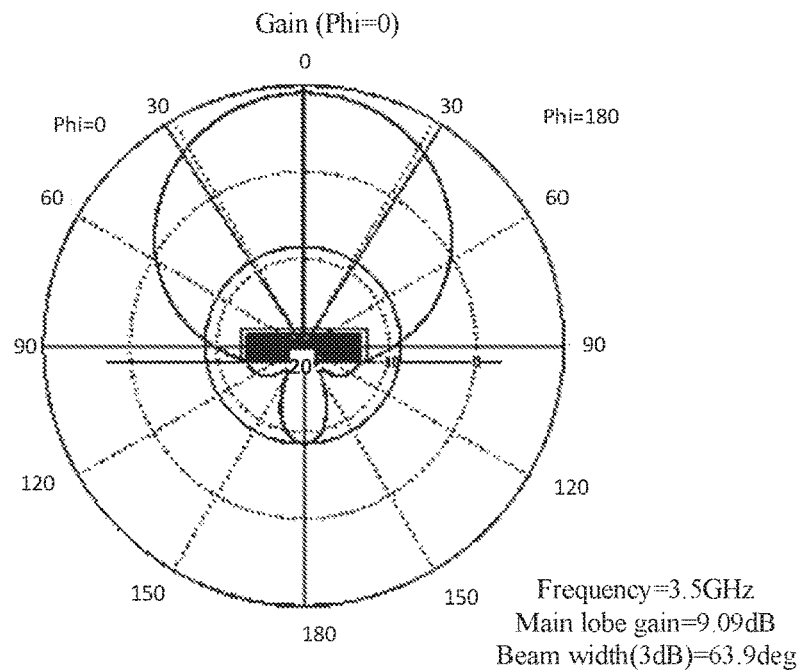
FIG. 10A is a diagram illustrating a radiation pattern of the antenna element provided according to the first embodiment of the present application in a Phi=0° plane.
Figure 10B:
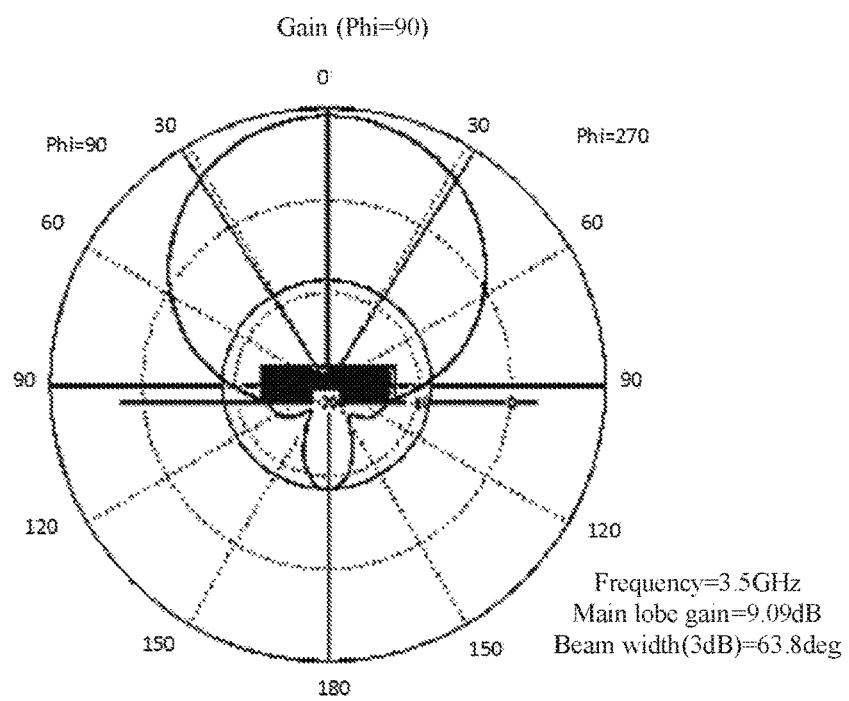
FIG. 10B is a diagram illustrating a radiation pattern of the antenna element provided according to the first embodiment of the present application in a Phi=90° plane.
Figure 11A:
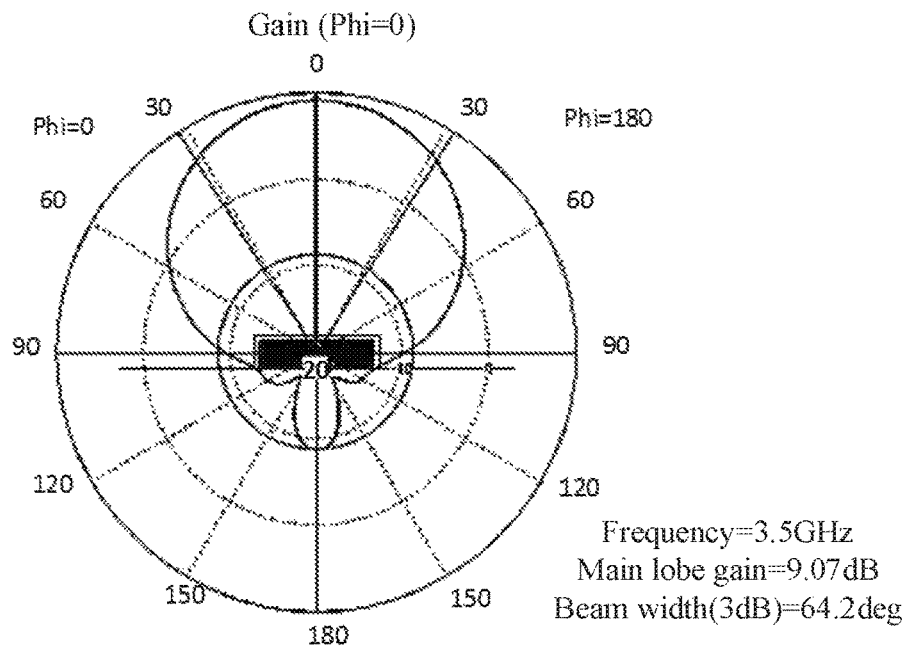
FIG. 11A is a diagram illustrating a radiation pattern of the antenna element provided according to the first embodiment of the present application in a Phi=0° plane.
Figure 11B:
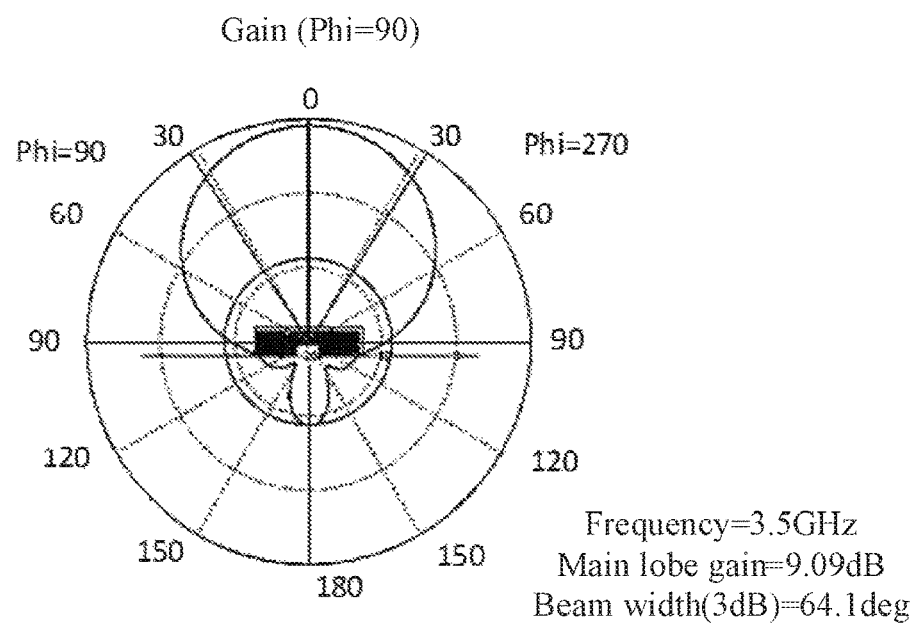
FIG. 11B is a diagram illustrating a radiation pattern of the antenna element provided according to the first embodiment of the present application in a Phi=90° plane.

Patterns of the first symmetrical oscillator of the antenna element 10 is shown in FIGS. 10A and 10B, and FIG. 10A is a pattern when the first symmetry oscillator operates at 3.5 GHz with an azimuth angle Phi=0°, wherein the main lobe gain is 9.09 dB and the 3 dB beam width is 63.9°. FIG. 10B is a pattern when the first symmetry oscillator operates at 3.5 GHz with an azimuth angle Phi=90°, wherein the main lobe gain is 9.09 dB and the 3 dB beam width is 63.8°. Patterns of the second symmetrical oscillator of the antenna element 10 is shown in FIGS. 11A and 11B, and FIG. 11A is the a pattern when the second symmetry oscillator operates at 3.5 GHz with an azimuth angle Phi=0°, wherein the main lobe gain is 9.07 dB and the 3 dB beam width is 64.2°. FIG. 11B is a pattern when the second symmetry oscillator operates at 3.5 GHz with an azimuth angle Phi=90°, wherein the main lobe gain is 9.07 dB and the 3 dB beam width is 61.4°.

Compared with the prior art, the signal of the first polarized antenna and the signal of the second polarized antenna are orthogonally polarized, such that the antenna element may operate in the duplex mode at the same time, which greatly reduces the number of antenna elements in each cell; the orthogonal polarization effectively ensures the good effect of diversity reception of the antenna element. Both the first symmetrical oscillator in the first polarized antenna and the second symmetrical oscillator in the second polarized antenna are in the same radiating surface, and signals are radiated by the radiating surface surrounded by the same asteroid, such that the size of the antenna element is reduced. At the same time, each side of the radiating surface is curved, such that the strength of the signal may be enhanced. The embodiments of the present application provide a lightweight antenna element with a low-profile, which improves the radiation range of the antenna and the range of carrying capacity.

The second embodiment of the present application relates to an antenna element. The second embodiment provides a further improvement made based on the first embodiment, and the main improvement is that the antenna element in the present embodiment further comprises at least one lightning protection grounding end 106.

Figure 12:
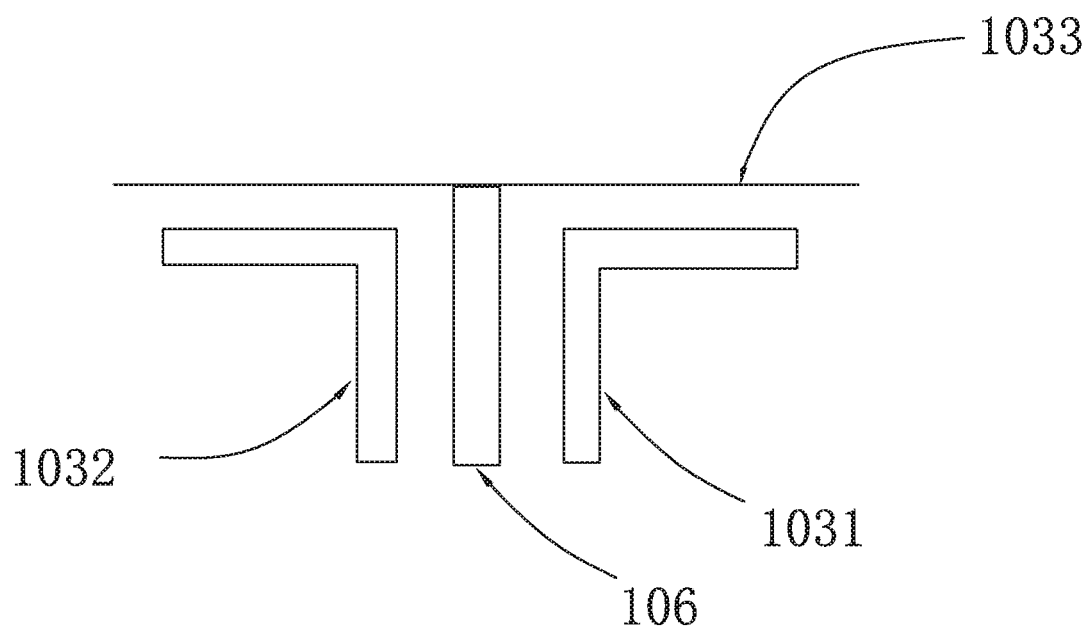
FIG. 12 is a schematic structural diagram illustrating a lightning protection grounding end of an antenna element provided according to a second embodiment of the present application.
Figure 12:
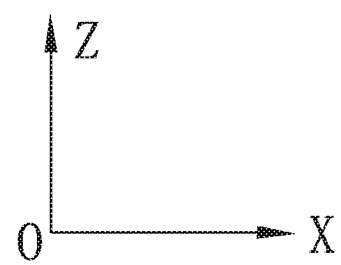

Specifically, the lightning protection grounding end 106 is electrically connected to a preset intermediate region of the radiating surface, and the lightning protection grounding end 106 is disposed in an intermediate region surrounded by the first feeding end 1031, the second feeding end 1032, the third feeding end 1041 (not shown in FIG. 12) and the fourth feeding end 1042 (not shown in FIG. 12). The lightning protection grounding end 106 is disposed at a position below the radiating surface, and FIG. 12 is a side view of the lightning protection grounding end.

A first end of the lightning protection grounding end 106 may be electrically connected to the radiating surface directly, and a second end of the lightning protection grounding end 106 is connected to a grounding port of the base station, meanwhile, the first symmetrical oscillator 1033 and the second symmetrical oscillator 1043 are both located on the radiating surface, and thus the probability of the antenna element being damaged in lightning weather may be reduced by the lightning protection grounding terminal 106. According to the present disclosure, one (as shown in FIG. 12) or two or more lightning protection grounding end 106 may be provided.

Figure 13:
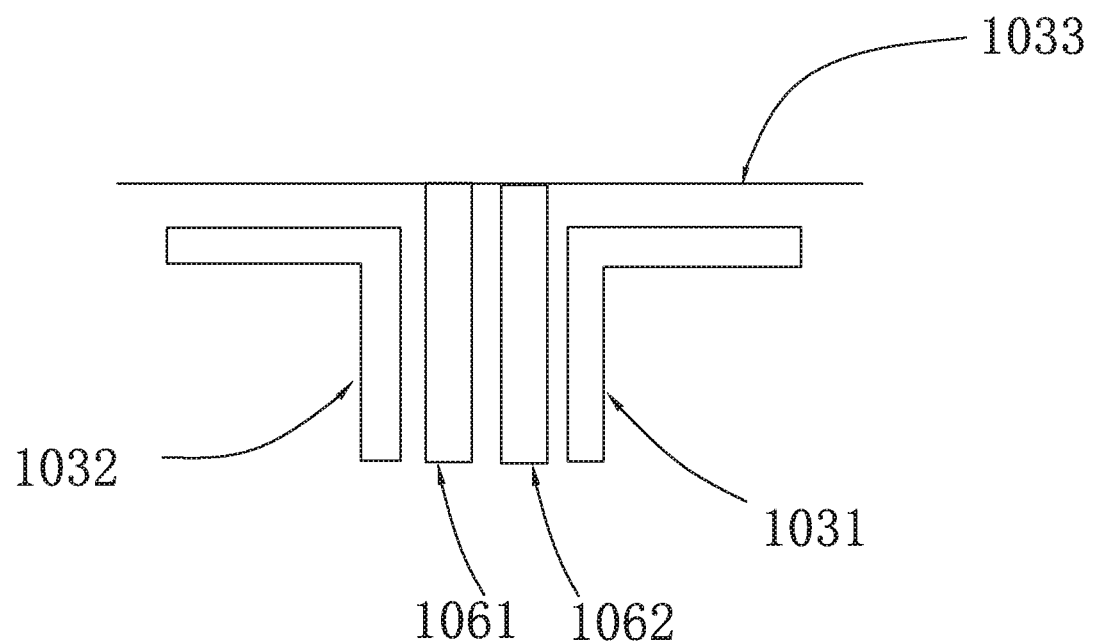
FIG. 13 is a schematic structural diagram illustrating another lightning protection grounding end of the antenna element provided according to the second embodiment of the present application.

In one embodiment, in order to better perform lightning protection, the number of the lightning protection grounding ends 106 may be four; the first lightning protection grounding end 1061 is electrically connected to the first oscillating arm (not shown in FIG. 13); and the second lightning protection grounding end 1062 is electrically connected to the second oscillating arm (not shown in FIG. 13). Similarly, the third lightning protection grounding end is electrically connected to the third oscillating arm; and the fourth lightning protection grounding end is electrically connected to the fourth oscillating arm, the structure diagram is similar to FIG. 13, and thus reference may be made to FIG. 13. The specific connection structure of the lightning protection grounding end 106 is shown in FIG. 13.

Figure 14A:
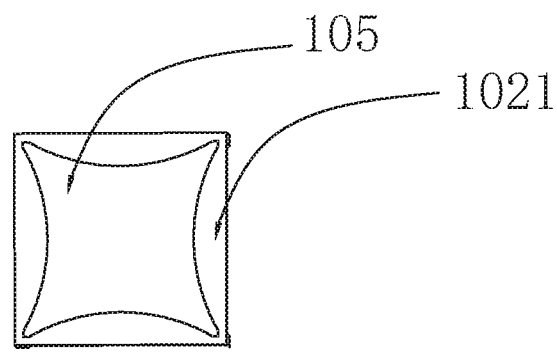
FIG. 14A is a schematic diagram illustrating a radiating surface in the antenna element provided according to the second embodiment of the present application.
Figure 14B:
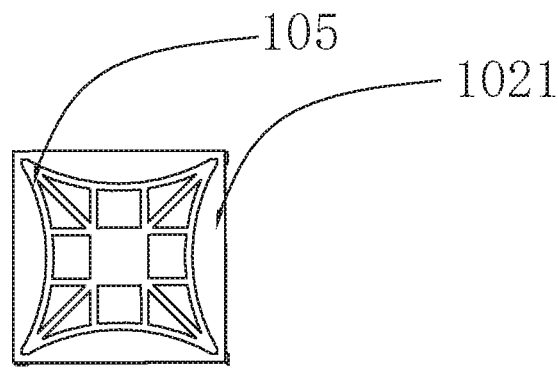
FIG. 14B is a schematic diagram illustrating a radiating surface in the antenna element provided according to the second embodiment of the present application.

It is worth mentioning that, after the lightning protection grounding end 106 is added in the present embodiment, similar to the first embodiment, when the radiating surface 105 is completely covered by a conductive layer (as shown in FIG. 14A), the radiating surface 105 may be disposed on the first surface of the supporting surface 1021 by a stamping process or a PCB process. If the four corners of the radiating surface 105 are hollowed out (as shown in FIG. 14B), the radiating surface 105 may be disposed on the first surface of the supporting surface 1021 by the LDS process.

Figure 14C:
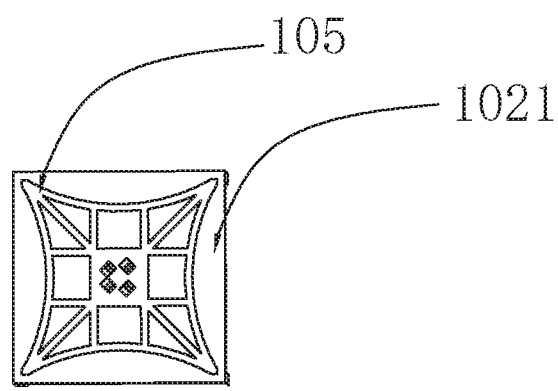
FIG. 14C is a schematic diagram illustrating a radiating surface in the antenna element provided according to the second embodiment of the present application.

It will be understood that four corners of the radiating surface 105 are disposed to be hollowed out; a corresponding surface of the radiating surface 105 and the first lightning protection grounding end 1061 are hollowed out, a corresponding surface of the radiating surface 105 and the second lightning protection grounding end 1062 are hollowed out, a corresponding surface of the radiating surface 105 and the third lightning protection grounding end are hollowed out; and a corresponding surface of the radiating surface 105 and the fourth lightning protection grounding end are hollowed out (as shown in FIG. 14C); the radiating surface 105 is disposed on the first surface of the supporting 1021 surface by LDS.

The antenna element provided in this embodiment prevents the antenna element from being damaged in lightning weather through the lightning protection grounding end. Further, each oscillating arm of the antenna element is electrically connected to a corresponding lightning protection grounding end to prevent each oscillating arm from being damaged in the lightning weather, thereby further ensuring the safety of the entire antenna element.

Figure 15:
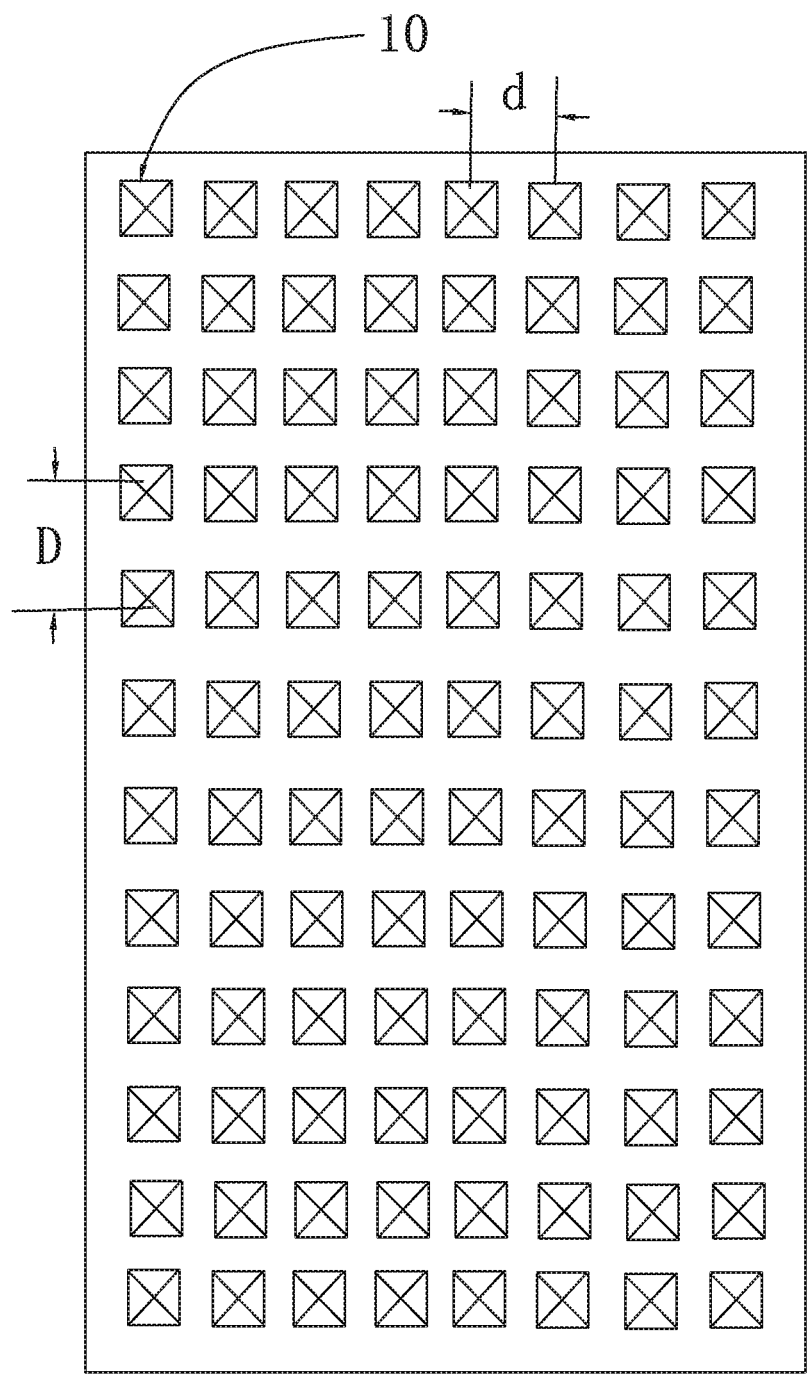
FIG. 15 is a schematic diagram illustrating an antenna array provided according to a third embodiment of the present application.

The third embodiment of the present application relates to an antenna array including at least two antenna elements 10 according to the first embodiment or the second embodiment. The antenna elements 10 may be arranged in a preset array manner. The preset array may be an array of 1×N, M×1, or M×N, where M is an integer greater than 1, and N is an integer greater than 1. In this embodiment, the preset array is 12×8, and each antenna element 10 comprises two polarized antennas to form an antenna array with 192 polarized ports. The form of the array is shown in FIG. 15.

Specifically, a distance between each two of the antenna elements 10 is more than ½λ (λ is the wavelength length), and the distance may be specifically set according to actual applications. For example, as shown in FIG. 15, when the frequency band is 3.5 GHz, the distance d between two of the antenna elements 10 of each row may be set to 44 mm, and the distance D between two of the antenna elements 10 of each column may be set to 60 mm. Of course, the distance between each two of the antenna elements in this embodiment is only an example, and the present embodiment is not limited thereto.

The fourth embodiment of the present application relates to a base station including the antenna array of the third embodiment.

The embodiments provided in the present application are applicable to the field of the wireless mobile communication base station, and are also applicable to the receiving and transmitting devices of various types of wireless communication systems, which are not specifically limited in the present embodiments.

It will be understood by those skilled in the art that the above embodiments are specific embodiments for implementing the present application, and in actual applications, various changes may be made in form and detail without departing from the spirit and range of the present application.

What is claimed is:

1. An antenna element applied to a base station, comprising: a metal floor;
   and a first polarized antenna and a second polarized antenna disposed on an insulating bracket, wherein, the insulating bracket is disposed on the metal floor;
   the first polarized antenna is orthogonal in polarization to the second polarized antenna;
   the first polarized antenna is composed of a first feeding end, a second feeding end, and a first symmetrical oscillator located on a radiating surface, the shape of which is a graph surrounded by an astroid, and the first symmetrical oscillator comprises a first oscillating arm and a second oscillating arm;
   the first oscillating arm and the second oscillating arm are symmetrically disposed by taking a center point of the radiating surface as a center of symmetry;
   the first oscillating arm is coupled to the first feeding end, and the second oscillating arm is coupled to the second feeding end, wherein the first feeding end and the second feeding end are differentially fed;

the second polarized antenna is composed of a third feeding end, a fourth feeding end, and a second symmetrical oscillator located on the radiating surface, and the second symmetrical oscillator comprises a third oscillating arm and a fourth oscillating arm;

the third oscillating arm and the fourth oscillating arm are symmetrically disposed by taking the center point of the radiating surface as a center of symmetry; and the third oscillating arm is coupled to the third feeding end, and the fourth oscillating arm is coupled to the fourth feeding end, wherein the third feeding end and the fourth feeding end are differentially fed;

the first feeding end comprises a first horizontal feeding piece and a first vertical feeding piece, a first end of the first horizontal feeding piece extends in a direction of the first oscillating arm, a second end of the first horizontal feeding piece is connected to a first end of the first vertical feeding piece, and a second end of the first vertical feeding piece extends in a direction perpendicular to the first horizontal feeding piece;

the second feeding end comprises a second horizontal feeding piece and a second vertical feeding piece, a first end of the second horizontal feeding piece extends in a direction of the second oscillating arm, a second end of the second horizontal feeding piece is connected to a first end of the second vertical feeding piece, and a second end of the second vertical feeding piece extends in a direction perpendicular to the second horizontal feeding piece;

the third feeding end comprises a third horizontal feeding piece and a third vertical feeding piece, a first end of the third horizontal feeding piece extends in a direction of the third oscillating arm, a second end of the third horizontal feeding piece is connected to a first end of the third vertical feeding piece, and a second end of the third vertical feeding piece extends in a direction perpendicular to the third horizontal feeding piece; and the fourth feeding end comprises a fourth horizontal feeding piece and a fourth vertical feeding piece, a first end of the fourth horizontal feeding piece extends in a direction of the fourth oscillating arm, a second end of the fourth horizontal feeding piece is connected to a first end of the fourth vertical feeding piece, and a second end of the fourth vertical feeding piece extends in a direction perpendicular to the fourth horizontal feeding piece.

2. The antenna element according to claim 1, wherein the insulating bracket comprises a supporting surface and a supporting frame; a first surface of the supporting surface is provided with the radiating surface, and a second surface of the supporting surface is connected to the supporting frame, wherein an area of the supporting surface is larger than that of the radiating surface;

the supporting frame comprises a first bracket and a second bracket, and the first bracket and the second bracket are disposed across each other;

the first feeding end and the second feeding end are symmetrically disposed on a sidewall of the first bracket by taking a center point of the supporting surface as a center of symmetry; and the third feeding end and the fourth feeding end are symmetrically disposed on a sidewall of the second bracket by taking the center point of the supporting surface as a center of symmetry.

3. The antenna element according to claim 1, wherein the antenna element further comprises at least one lightning protection grounding end, and the lightning protection grounding end is electrically connected to a preset intermediate region of the radiating surface; and the lightning protection grounding end is disposed within an intermediate region surrounded by the first feeding end, the second feeding end, the third feeding end and the fourth feeding end.

4. The antenna element according to claim 3, wherein the number of the lightning protection grounding ends is four;

the first lightning protection grounding end is electrically connected to the first oscillating arm;

the second lightning protection grounding end is electrically connected to the second oscillating arm;

the third lightning protection grounding end is electrically connected to the third oscillating arm; and the fourth lightning protection grounding end is electrically connected to the fourth oscillating arm.

5. The antenna element according to claim 4, wherein four corners of the radiating surface are disposed to be hollowed out;

a corresponding surface of the radiating surface and the first lightning protection grounding end is hollowed out, a corresponding surface of the radiating surface and the second lightning protection grounding end is hollowed out, a corresponding surface of the radiating surface and the third lightning protection grounding end is hollowed out, and a corresponding surface of the radiating surface and the fourth lightning protection grounding end is hollowed out; and the radiating surface is disposed on the insulating bracket through Laser Direct Structuring.

6. The antenna element according to claim 3, wherein a surface of the radiating surface is completely covered by a conductive layer; and the radiating surface is disposed on the insulating bracket through a stamping process or a process for manufacturing a printed circuit board.

7. The antenna element according to claim 3, wherein four corners of the radiating surface are disposed to be hollowed out, and a surface on which the preset intermediate region of the radiating surface is located is completely covered;

the radiating surface is disposed on the insulating bracket through Laser Direct Structuring.

8. An antenna array, comprising at least two antenna elements, wherein the antenna elements are arranged in a predetermined array, and each of the antenna element comprises: a metal floor; and a first polarized antenna and a second polarized antenna disposed on an insulating bracket, wherein, the insulating bracket is disposed on the metal floor;

the first polarized antenna is orthogonal in polarization to the second polarized antenna;

the first polarized antenna is composed of a first feeding end, a second feeding end, and a first symmetrical oscillator located on a radiating surface, the shape of which is a graph surrounded by an astroid, and the first symmetrical oscillator comprises a first oscillating arm and a second oscillating arm;

the first oscillating arm and the second oscillating arm are symmetrically disposed by taking a center point of the radiating surface as a center of symmetry;

the first oscillating arm is coupled to the first feeding end, and the second oscillating arm is coupled to the second feeding end, wherein the first feeding end and the second feeding end are differentially fed;

the second polarized antenna is composed of a third feeding end, a fourth feeding end, and a second symmetrical oscillator located on the radiating surface, and the second symmetrical oscillator comprises a third oscillating arm and a fourth oscillating arm;

the third oscillating arm and the fourth oscillating arm are symmetrically disposed by taking the center point of the radiating surface as a center of symmetry; and the third oscillating arm is coupled to the third feeding end, and the fourth oscillating arm is coupled to the fourth feeding end, wherein the third feeding end and the fourth feeding end are differentially fed;

the first feeding end comprises a first horizontal feeding piece and a first vertical feeding piece, a first end of the first horizontal feeding piece extends in a direction of the first oscillating arm, a second end of the first horizontal feeding piece is connected to a first end of the first vertical feeding piece, and a second end of the first vertical feeding piece extends in a direction perpendicular to the first horizontal feeding piece;

the second feeding end comprises a second horizontal feeding piece and a second vertical feeding piece, a first end of the second horizontal feeding piece extends in a direction of the second oscillating arm, a second end of the second horizontal feeding piece is connected to a first end of the second vertical feeding piece, and a second end of the second vertical feeding piece extends in a direction perpendicular to the second horizontal feeding piece;

the third feeding end comprises a third horizontal feeding piece and a third vertical feeding piece, a first end of the third horizontal feeding piece extends in a direction of the third oscillating arm, a second end of the third horizontal feeding piece is connected to a first end of the third vertical feeding piece, and a second end of the third vertical feeding piece extends in a direction perpendicular to the third horizontal feeding piece; and the fourth feeding end comprises a fourth horizontal feeding piece and a fourth vertical feeding piece, a first end of the fourth horizontal feeding piece extends in a direction of the fourth oscillating arm, a second end of the fourth horizontal feeding piece is connected to a first end of the fourth vertical feeding piece, and a second end of the fourth vertical feeding piece extends in a direction perpendicular to the fourth horizontal feeding piece.

9. The antenna array according to claim 8, wherein the insulating bracket comprises a supporting surface and a supporting frame; a first surface of the supporting surface is provided with the radiating surface, and a second surface of the supporting surface is connected to the supporting frame, wherein an area of the supporting surface is larger than that of the radiating surface;

the supporting frame comprises a first bracket and a second bracket, and the first bracket and the second bracket are disposed across each other;

the first feeding end and the second feeding end are symmetrically disposed on a sidewall of the first bracket by taking a center point of the supporting surface as a center of symmetry; and the third feeding end and the fourth feeding end are symmetrically disposed on a sidewall of the second bracket by taking the center point of the supporting surface as a center of symmetry.

10. The antenna array according to claim 8, wherein the antenna element further comprises at least one lightning protection grounding end, and the lightning protection grounding end is electrically connected to a preset intermediate region of the radiating surface; and the lightning protection grounding end is disposed within an intermediate region surrounded by the first feeding end, the second feeding end, the third feeding end and the fourth feeding end.

11. The antenna array according to claim 10, wherein the number of the lightning protection grounding ends is four;

the first lightning protection grounding end is electrically connected to the first oscillating arm;

the second lightning protection grounding end is electrically connected to the second oscillating arm;

the third lightning protection grounding end is electrically connected to the third oscillating arm; and the fourth lightning protection grounding end is electrically connected to the fourth oscillating arm.

12. The antenna array according to claim 11, wherein four corners of the radiating surface are disposed to be hollowed out;

a corresponding surface of the radiating surface and the first lightning protection grounding end is hollowed out, a corresponding surface of the radiating surface and the second lightning protection grounding end is hollowed out, a corresponding surface of the radiating surface and the third lightning protection grounding end is hollowed out, and a corresponding surface of the radiating surface and the fourth lightning protection grounding end is hollowed out; and the radiating surface is disposed on the insulating bracket through Laser Direct Structuring.

13. The antenna array according to claim 10, wherein a surface of the radiating surface is completely covered by a conductive layer; and the radiating surface is disposed on the insulating bracket through a stamping process or a process for manufacturing a printed circuit board.

14. The antenna array according to claim 10, wherein four corners of the radiating surface are disposed to be hollowed out, and a surface on which the preset intermediate region of the radiating surface is located is completely covered;

the radiating surface is disposed on the insulating bracket through Laser Direct Structuring.

15. A base station comprising an antenna array as described in claim 8.

* * * * *